UNITED STATES PATENT OFFICE.

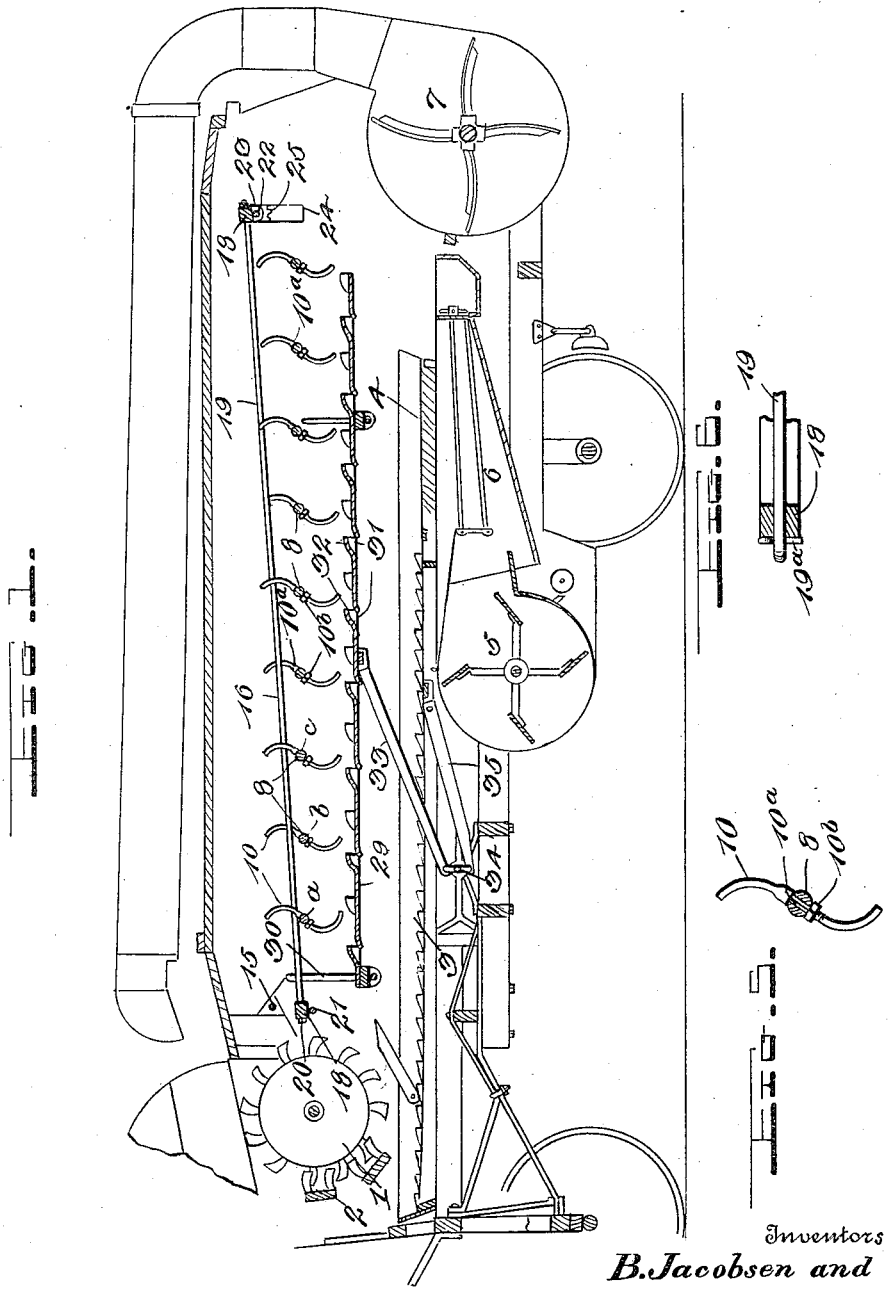

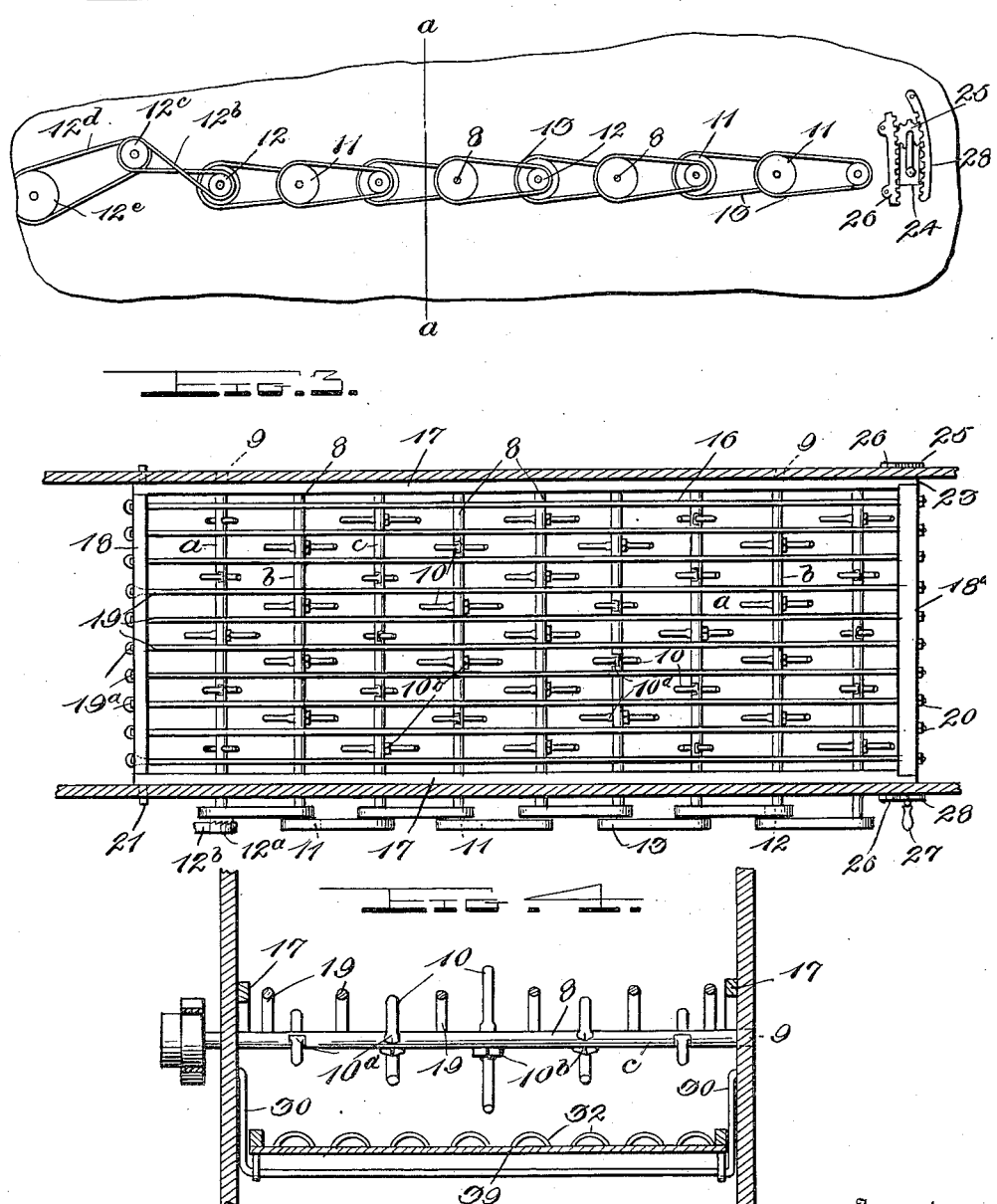

BERNHARD JACOBSEN AND KNUT S. NYGAARD, OF MEKINOCK, NORTH DAKOTA.

THRESHING-MACHINE.

1,033,899. Specification of Letters Patent. Patented July 30, 1912.

Application filed January 2, 1912. Serial No. 668,818.

*To all whom it may concern:*

Be it known that we, BERNHARD JACOBSEN and KNUT S. NYGAARD, citizens of the United States, residing at Mekinock, in the county of Grand Forks and State of North Dakota, have invented certain new and useful Improvements in Threshing-Machines, of which the following is a specification, reference being had to the accompanying drawings.

This invention relates to improvements in threshing machines and especially to improvements in the straw shaking mechanism which receives the threshed straw from the cylinder and concaves, completes the threshing of the straw and delivers the threshed straw to the stacker, the invention consisting in the construction, combination and arrangement of devices hereinafter described and claimed.

One object of our invention is to provide an improved straw shaker which comprises a series of revoluble shafts carrying shaking fingers and a rake and carrier frame having spaced rods between which the rotary fingers operate.

Another object is to so construct the carrier rake as to enable the same to be disposed at any desired inclination, so as to regulate the discharge of the threshed straw from the machine and control the speed of the straw while passing over the shaker and carrier rake.

Another object is to improve the efficiency of the shaker by providing means whereby the rotary shafts thereof, which carry the fingers, are revolved at successively higher rates of speed toward the rear of the shaker.

A further object is to increase the efficiency of the rotary shaker by arranging the radiating fingers in a novel manner on the shafts which carry them.

Another object is to combine with our improved rotary straw shaker a chaffing pan which is disposed below the same, and which serves to prevent the short straw and chaff from being delivered on to the grain pan of the thresher.

In the accompanying drawings: Figure 1 is a vertical longitudinal central sectional view of a rotary straw shaker and chaffing pan constructed in accordance with our invention, showing the same in a threshing machine in operative relation to the various parts of the machine, the threshing mechanism, grain pan, chaffer, blower, sieves and stacker being indicated diagrammatically; Fig. 2 is an elevation of the system of belts and pulleys for actuating the shaker fingers, and the mechanism for raising and lowering the rake frame. Fig. 3 is a plan of the same; Fig. 4 is a vertical transverse sectional view of the same on the plane indicated by the line *a—a* of Fig. 2; Fig. 5 is a detail sectional view, on a larger scale, of one of the shaker shafts and one of the fingers thereon; and Fig. 6 is a similar view of one end of the rake and carrier frame.

For the purposes of this specification, in Fig. 1 we show our rotary straw shaker and chaffing pan in operative relation to the various parts of a threshing machine, the cylinder being indicated at 1, the concaves at 2, the grain pan at 3, the chaffer at 4, the blower at 5, the sieves at 6 and the pneumatic stacker at 7. The beater is indicated at 15. These parts are of well known construction and are not of our invention.

In accordance with our invention we provide a series of shafts 8 which are disposed in a common plane, extend transversely across the machine casing and have their bearings in the sides thereof as at 9. These shafts are provided with curved shaker fingers 10, the chords of which are radial to the shafts. These shafts are arranged in groups of three. The shaft *a* of each group has its fingers spirally arranged so that the fingers act consecutively on the straw and are disposed at different points in the direction of rotation of the shafts. The spiral arrangement of the fingers of the shaft *a* is such that the fingers tend to move the straw from the sides toward the center of the casing as well as to beat or shake the straw so as to dislodge the grain therefrom and to urge the straw rearwardly to the stacker. The shaft *b* of each group has its fingers arranged in right lines longitudinally of the shaft. The shaft *c* of each group has its fingers arranged spirally but reversely to the fingers on the shaft *a* so that the fingers of the shaft *c*, in addition to shaking and beating the straw and urging the same rearwardly, also tend to move the straw from the center toward the sides of the casing. Hence the straw is moved transversely in reverse directions in the casing as well as longitudinally thereof by our rotary fingered shafts during the operation of the machine.

Each of the fingers has a cross sectionally square central portion 10ª which passes through a correspondingly shaped opening in the shaker shaft and is also provided with threaded portions, engaged by nuts 10ᵇ which detachably secure the finger thereto. By this construction any one of the fingers which may become broken or injured may be readily removed from the shaft which carries it and another finger substituted in its stead.

The shafts of our rotary straw shaker are connected together in series for rotation at higher rates of speed progressively toward the rear end of the machine so that each shaker shaft rotates at a somewhat higher rate of speed than the next shaker shaft to the front. Within the scope of our invention any suitable means may be employed to operate the shaker shafts at various rates of speed. For the purposes of this specification, each shaft is shown provided at one end with pulleys 11, 12, the latter smaller than the former, and the pulleys of the respective shafts arranged in reverse order and we also show endless belts 13 which connect each larger pulley 11 of a shaft to the smaller pulley 12 of the next shaft in rear thereof. The foremost shaker shaft is provided with a clutch pulley 12ª which is engaged by a crossed belt 12ᵇ. The said crossed belt also engages a pulley 12ᶜ on the beater shaft of the threshing machine, the beater being driven by a belt 12ᵈ from a pulley 12ᵉ on the cylinder shaft. The clutch pulley is employed in order to prevent the shaker shafts from rotating reversely in the event that the machine should be reversed, the clutch pulley only permitting the shaker shafts to rotate in the required direction.

In connection with the rotary fingered shafts we provide a rake carrier frame 16 which comprises side bars 17 and front and rear end bars 18, 18ª, respectively. The end bars are also connected together by longitudinally disposed bars 19 which, in practice, are rods of suitable diameter which have their rear ends screw threaded and provided with nuts 20 which bear against the rear end bar 18ª. The front ends of these bars 19 pass through openings in the front end bar 18 and are provided with transverse openings in which are inserted split keys 19ª, the said split keys bearing against the front sides of the said front end bar 18. By adjusting the nuts 20 these longitudinally disposed rake bars may be kept at the required tension. By first removing the split keys, which may be very readily done, the rake bars may be removed and replaced, when necessary, in a very short space of time and with but little effort. These rake bars are spaced apart and the fingers of the rotary shafts 8 move upwardly through the spaces between the said bars. It will be observed by reference to Fig. 3 that the fingers of the respective shafts are arranged in staggered relation. Hence the fingers of each alternate shaft operate in alternate spaces between the bars of the rake and carrier frame. The rake and carrier frame is pivotally mounted at its front end as at 21 and is provided at its rear end with a shaft 22 which is journaled in suitable bearings 23, passes through and is movable in slots 24 in the sides of the machine casing and is provided with pinions 25 which engage racks 26 with which the sides of the machine casing are provided. The said shaft is also provided at one end with a crank 27 whereby it may be turned in either direction, and it will be understood that by this means the rear end of the rake and carrier frame may be raised or lowered in order to dispose the said frame at any desired inclination and hence regulate the speed of the straw in passing over the said frame from the front to rear end thereof by the action of the shaker fingers. In order to support the frame of the racks and carrier at any desired adjustment we provide a pawl 28 which is pivotally supported at its upper end and is provided with a series of teeth, any one of which may be engaged with one of the pinions.

We also provide a chaffing pan 29 which is disposed below the rotary straw shaker shafts 8 and is supported by hangers 30, of usual form, which enable the said pan to be vibrated or reciprocated longitudinally. The bottom of the chaffing pan is provided with openings 31, over which are rearwardly directed teeth 32. The "saves," or grain which drops from the straw shaker and rake and carrier frame on to the chaffing pan, are subjected to air blasts which carry off the chaff, short pieces of straw and the like so that the grain which drops from the chaffing pan on to the grain pan 3 is comparatively clean before being fed to the chaffer 4 from the grain pan.

The chaffing pan 29 may be operated by any suitable means. We here show it operated by a pitman 33 driven by the crank of a shaft 34 which also operates the pitman 35 which drives the grain pan 3 and adjustable chaffer 4.

Our improved rotary straw shaker may be used in any of the various forms of threshing machines in lieu of the straw shakers heretofore employed.

While we have herein shown and described the various parts of our invention in detail we would have it understood that modifications may be made therein within the scope of our invention as defined by the appended claims.

Having thus described our invention we claim:

1. A straw shaker of the class described comprising a series of revoluble shafts, fingers carried by the shafts, the said shafts being arranged in groups of three, the fingers on the central shaft of each group being arranged in right lines longitudinally of the shaft and the fingers on the other shafts of the group being spirally arranged, the fingers on one of said shafts being disposed in reversed spiral relation to those on the other shaft, and a rake frame above the shafts and having longitudinally spaced bars, the said fingers operating in the spaces between the said bars.

2. A straw shaker of the class described comprising a series of revoluble shafts, fingers carried by the shafts and disposed at different points in the direction of rotation of the said shafts, a rake frame above the shafts and having longitudinal spaced bars, the said rake frame being pivotally mounted at one end, and means provided at its opposite end whereby the rake frame may be inclined to any desired angle with respect to the common plane of the shaker shafts.

3. A straw shaker of the class described comprising a series of revoluble shafts, fingers carried by the shafts, the said shafts being arranged in groups of three, the fingers on the central shaft of each group being arranged in right lines longitudinally of the shaft, and the fingers on the other shafts of the other group being spirally arranged, and a rake frame above the shafts and having longitudinally spaced bars, the said fingers operating in spaces between the bars.

In testimony whereof we hereunto affix our signatures in the presence of two witnesses.

BERNHARD JACOBSEN.
KNUT S. NYGAARD.

Witnesses:
HENRY LARSON,
LEWIS BRITTON.

Copies of this patent may be obtained for five cents each, by addressing the "Commissioner of Patents, Washington, D. C."